United States Patent
Kraus, Jr.

[11] 3,721,323
[45] March 20, 1973

[54] CLAMPING DEVICE

[75] Inventor: Michael Henry Kraus, Jr., Hammond, Ind.

[73] Assignee: Amsted Industries Incorporated, Chicago, Ill.

[22] Filed: May 19, 1971

[21] Appl. No.: 144,768

[52] U.S. Cl.............................188/206 R, 188/209
[51] Int. Cl.................................................F16d 65/06
[58] Field of Search....188/206 R, 209; 287/100, 101

[56] References Cited

UNITED STATES PATENTS

| 1,199,869 | 10/1916 | Burton | 188/206 R |
| 2,509,285 | 5/1950 | Bendicsen | 287/100 X |
| 2,725,124 | 11/1955 | Holin | 188/206 R |

*Primary Examiner*—Duane A. Reger
*Attorney*—Walter L. Schlegel, Jr. and John W. Yakimow

[57] ABSTRACT

A clamping device is provided for a brake rigging having spaced brake hangers separated by a brake head. A pin is located in a passage in the brake hangers and brake head and is used as a pivotal point to provide movement between the head and the hangers. A hexagonal shaped nut is threaded on to one end of the pin and is engaged in a hexagonal shaped opening in one of the brake hangers. The shape of the nut and the opening is such that the nut may not be rotated within the opening. The other end of the pin has an asymmetrical portion which projects outwardly from the other brake hanger. A first washer is engaged with the asymmetrical portion and has a hexagonal shape outer surface engaged within a hexagonal shaped opening in the hanger. The washer-pin-opening arrangement is such that the washer may not be rotated relative to the pin or the opening. A compression spring encircles the asymmetrical portion of the pin. A second washer engages the outer portion of the compression spring and is used, in combination with a nut, to force the first washer into the hexagonal shaped opening and hold the pin relative to the brake hangers.

4 Claims, 4 Drawing Figures

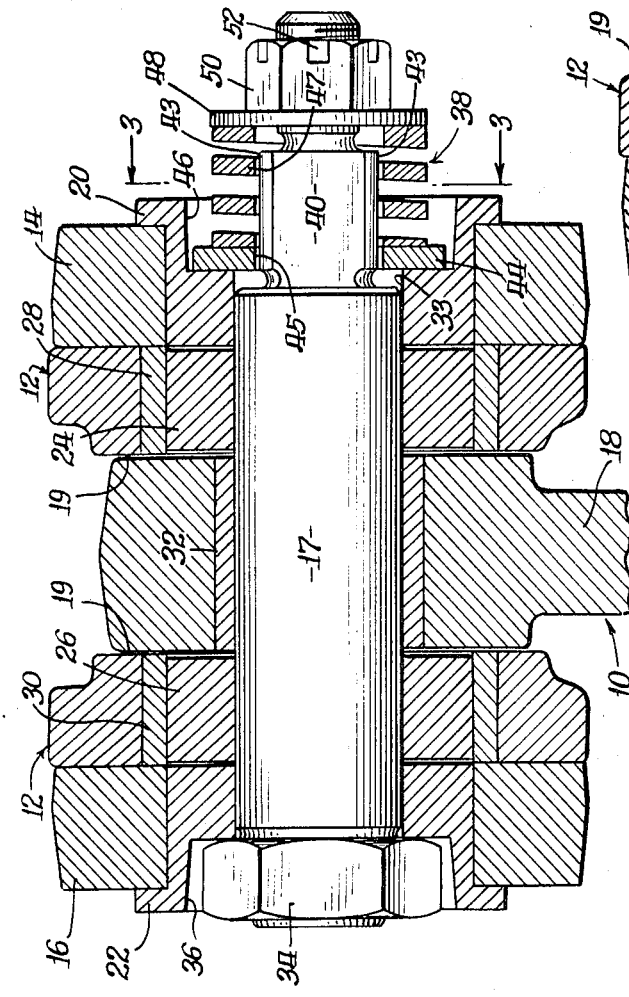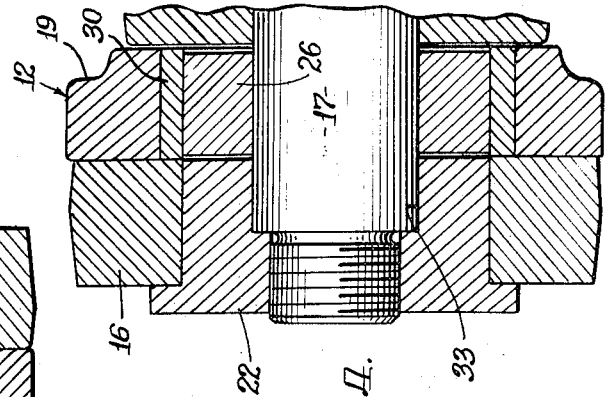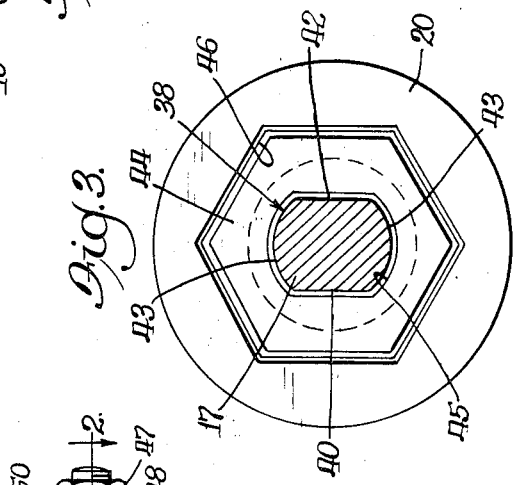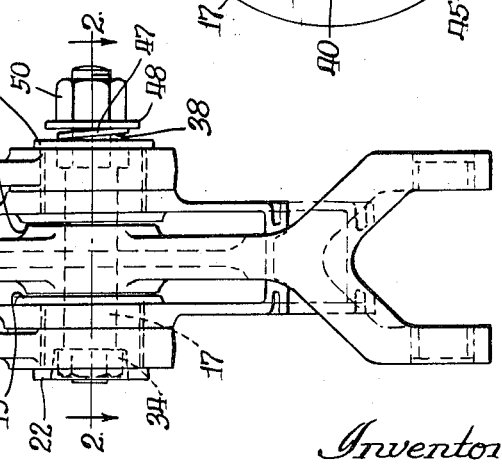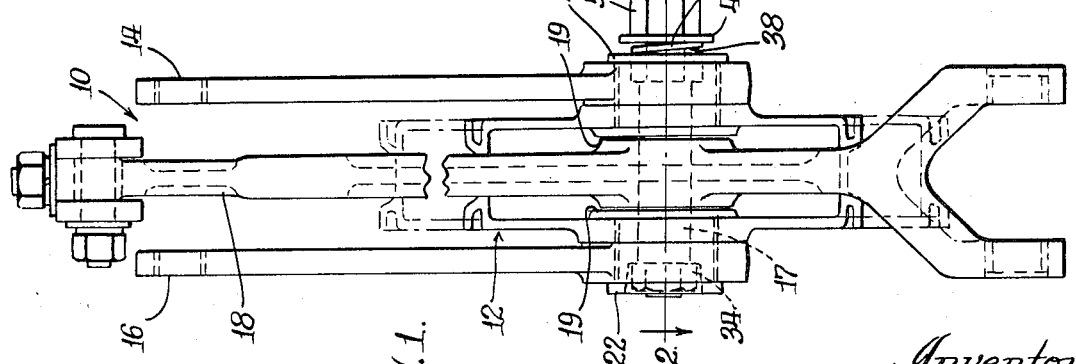

CLAMPING DEVICE

BACKGROUND OF THE INVENTION

For years brake heads have been retained between brake hangers by a pin passing through openings in each of the members. One end of the pin is in threaded engagement with a nut while the head of the pin is engaged in a hexagonal shaped opening in one of the brake hangers. This arrangement has been found to be satisfactory in some applications but does create substantial problems in applications where clearance is limited on one side of the brake assembly. In limited clearance arrangements, it is extremely difficult to remove the pin from the opening in order to replace worn brake heads and pins.

BRIEF DESCRIPTION OF THE INVENTION

This patent discloses a device which provides clamping force between mating parts, restricts rotation of the clamping pin after assembly and provides an area for wrench engagement in order that the pin may be readily threaded into parts of or removed from the assembly. These results are accomplished by providing a cylindrical pin which may be engaged with cylindrical openings in the brake hangers and the brake head. One end of the pin is in threaded engagement with a hexagonal shaped nut which is engaged in a hexagonal shaped opening. The nut may not be rotated relative to the opening. The other end of the pin has an asymmetric portion in engagement with a washer having a hexagonal shaped outer portion. The outer portion of the washer is engaged in a hexagonal shaped opening located in the corresponding brake hanger. The washer may not be rotated relative to the asymmetric portion of the pin or the opening. A spring is used to force the washer against a shoulder in the opening and retain it therein. The spring is compressed by means of a nut in threaded engagement with an outboard end of the pin. It may readily be seen that the hexagonal shaped nut in the opening may not be rotated relative to the opening and that the washer on the opposite end of the pin prevents rotation of the pin relative to the opposed opening. These two openings may be formed within ferrules pressed onto the opposed brake hangers or if desired may be formed within the brake hangers themselves. In such a way, the pin may be removed from the assembly by removing the nut outboard from the asymmetric portion and then either pushing the pin and nut through the assembly or threadedly disengaging the pin from the hexagonal shaped nut in the hexagonal shaped opening and then withdrawing the pin from either direction from the assembly.

BRIEF DESCRIPTION OF THE DRAWINGS

FIG. 1 is a side elevational view of a brake head assembly;

FIG. 2 is an enlarged sectional view taken at line 2—2 of FIG. 1;

FIG. 3 is a sectional view taken at line 3—3 of FIG. 2; and

FIG. 4 is a fragmentary view of one end of a brake head assembly similar to the one illustrated in FIG. 2 but embodying other features of the invention.

DETAILED DESCRIPTION OF THE DRAWINGS

FIG. 1 is a side view of a known brake rigging 10 having a brake head 12 pivotally connected to opposed brake hangers 14 and 16 by a pin 17. A live lever 18 is located intermediate side portions 19 of brake head 12 on pin 17. The upper portions of brake hangers 14 and 16 are pivotally secured to a known railway truck by pins (not shown). The upper portion of live lever 18 is connected to a known pneumatic cylinder (not shown) and is moved to engage brake head 12 with a railway wheel (not shown) in a known manner.

As illustrated in FIG. 2, outer ferrules 20 and 22 are in pressfit engagement with the brake hangers 14 and 16. Inner ferrules 24 and 26 are engaged with bushings 28 and 30, located in side portions 19 of brake head 12. Another bushing 32 is engaged within live lever 18. The outer ferrules 20 and 22 together with the inner ferrules 24 and 26 and bushing 32 define a cylindrical opening 33 through brake rigging 10.

One end of pin 17 is in threaded engagement with a hexagonal shaped nut 34. The hexagonal outer portion of nut 34 is located within a hexagonal indentation 36 in outer ferrule 22. The indentation 36 prevents movement of hexagonal shaped nut 34 relative to outer ferrule 22.

The opposite end of pin 17 has an asymmetric portion 38 defined by flat surfaces 40 and 42 and opposed arcuate surfaces 43. A spacer 44 having an opening 45 conforming to the asymmetric shape of the portion 38 of pin 17 has a hexagonal shaped outer surface engaged within a hexagonal shaped indentation 46 in outer ferrule 20. The spacer 44 may not be rotated relative to ferrule 20 or pin 17.

A compression spring 47 encircles the asymmetric portion 38 of pin 17 forcing spacer 44 into indentation 46. The spring 47 is compressed by means of a washer 48 and a nut 50 in threaded engagement with an outboard end of pin 17. The nut 50 may be held relative to pin 17 by any one of a number of known means, such as, a cotter pin 52.

In assembling the brake rigging 10, the pin 17 is located within opening 33. The hexagonal shaped nut 34 is threaded onto one end of the pin 17 and then located within the hexagonal shaped indentation 36 in outer ferrule 22. The spacer 44 is then slid over the asymmetric portion 38 of pin 17 into the hexagonal shaped opening 46 in outer ferrule 20. The spring 47 is next located around the asymmetric portion 38 and the washer 48 is located on the outer end of pin 17. Nut 50 may thereafter be threaded on the outer end of pin 17 and secured in place by cotter pin 52 in a known manner. It should be appreciated that in attaching hexagonal shaped nut 34 onto one end of pin 17 a wrench may be used to hold on to flat sides 40 and 42 of asymmetrical portion 38. A second wrench may, in a known manner, be used to grasp the outer surface of hexagonal nut 34 to tighten nut 34 and pin 17 relative to each other.

If desired, nut 34 may be located within indentation 36 and the pin 17 may be threaded into the nut by means of a wrench on asymmetric portion 38. The nut 34 will be held from turning by the walls of indentation 36.

The spring 47 provides a degree of flexibility to the assembly 10. Nut 34 may move axially relative to spacer 44 without disengaging either part from their respective openings 36 and 46 and permitting their rotation relative to one another.

FIG. 4 illustrates another embodiment of the invention, wherein the ferrule 22 is pressed into the brake hanger 16. The pin 17 is threaded into the ferrule 22 in a known manner. This threading may be accomplished by locating a wrench on asymmetric portion 38 and turning pin 17 relative to ferrule 22. Once the pin is threaded into ferrule 22 the spacer 44 may be located around the asymmetric portion 38 and the assembly of the brake rigging 10 may be completed as previously described.

It should be appreciated that the indentations located in outer ferrules 22 and 20 of FIGS. 1 and 2 or 20 of FIG. 3, may be located in the respective brake hangers. Further, the location of and the need for the inner ferrules 24 and 26 and the bushings 28, 30 and 32 may be varied according to standard mechanical design principles.

What is claimed is:

1. In a brake rigging having a first member located intermediate a second member and a third member, the members having a cylindrical passage therethrough, a clamping device comprising: a cylindrical pin in said passage, an asymmetrical end portion adjacent the second member and projecting outwardly therefrom, and a threaded end portion adjacent the third member; threads on the third member in engagement with the threaded end portion, and means engaged with the asymmetrical end portion and the second member to prevent rotation of the pin relative to the second member.

2. In a brake rigging having a first member located intermediate a second member and a third member, the members having a cylindrical passage therethrough, a clamping device comprising: a cylindrical pin in said passage, an asymmetrical end portion adjacent the second member and projecting outwardly therefrom, and a threaded end portion adjacent the third member; an asymmetrical indentation in the third member; a nut located within the asymmetrical indentation in threaded engagement with the threaded end portion of the pin, the nut having an outer asymmetrical configuration which conforms to the configuration of the asymmetrical indentation such that the nut may not be rotated relative to the indentation when the nut is located therein; and means engaged with the asymmetrical end portion of the pin and with the second member to prevent rotation of the pin relative to the second member.

3. A clamping device according to claim 2, wherein the second member has an asymmetrical indentation, and the means comprises a spacer having an interior opening closely conforming to the asymmetrical end portion of the pin, and an outer configuration closely conforming to the asymmetrical indentation in the second member, the spacer being engaged with the asymmetrical end portion of the pin and located within the asymmetrical indentation in the second member.

4. A clamping device according to claim 3, wherein the pin extends outwardly beyond the asymmetrical end portion, a spring encircles the asymmetrical end portion of the pin and is engaged at one end with the spacer, and fastening means are secured to the end of the pin outwardly from the asymmetrical end portion to compress the spring and force the spacer into the asymmetrical indentation in the second member.

* * * * *